July 21, 1942.   E. E. WEMP   2,290,513
CENTRIFUGAL CLUTCH
Filed Oct. 23, 1939   2 Sheets-Sheet 2
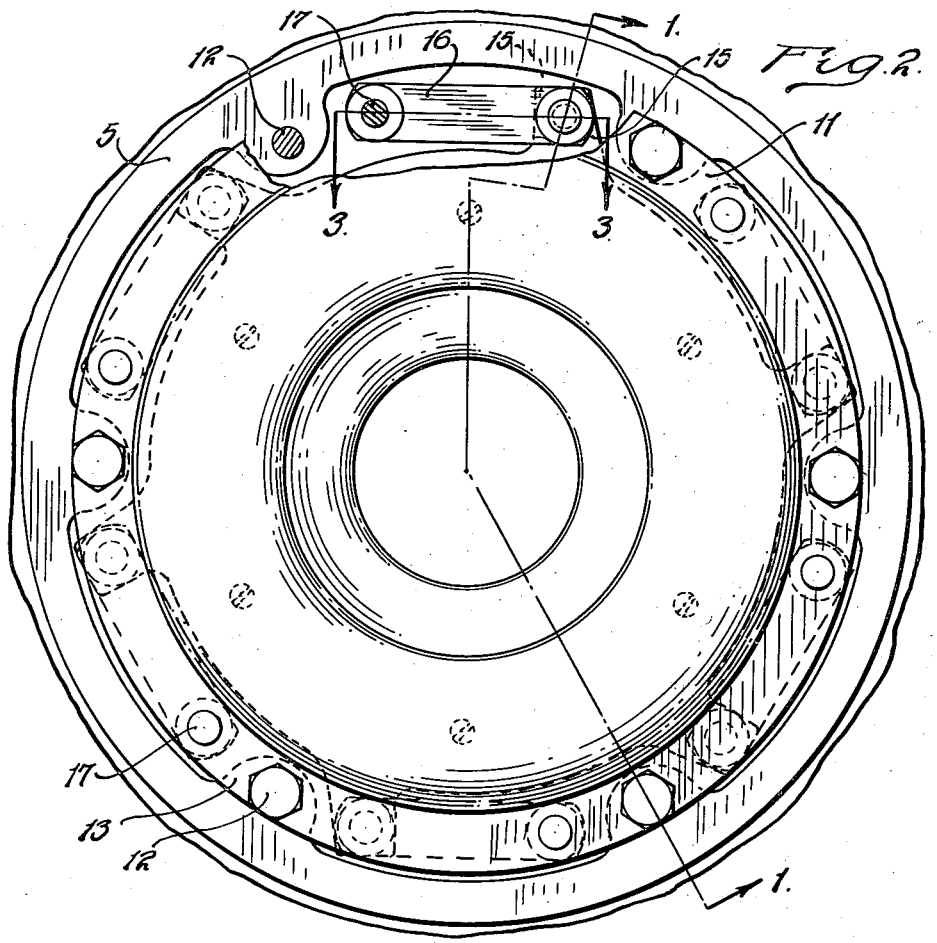
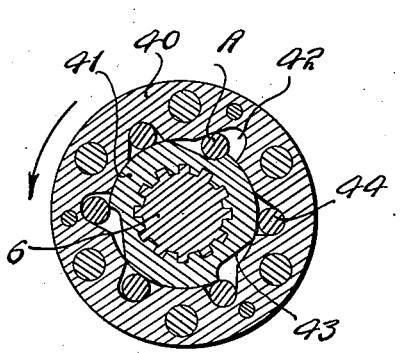
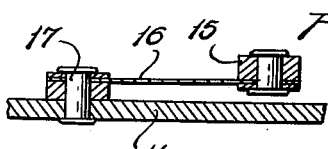
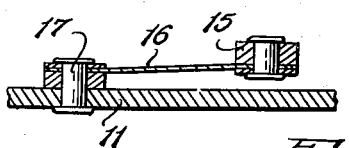
INVENTOR.
ERNEST E. WEMP.
BY Barnes, Kisselle, Laughlin & Raisch
ATTORNEYS.

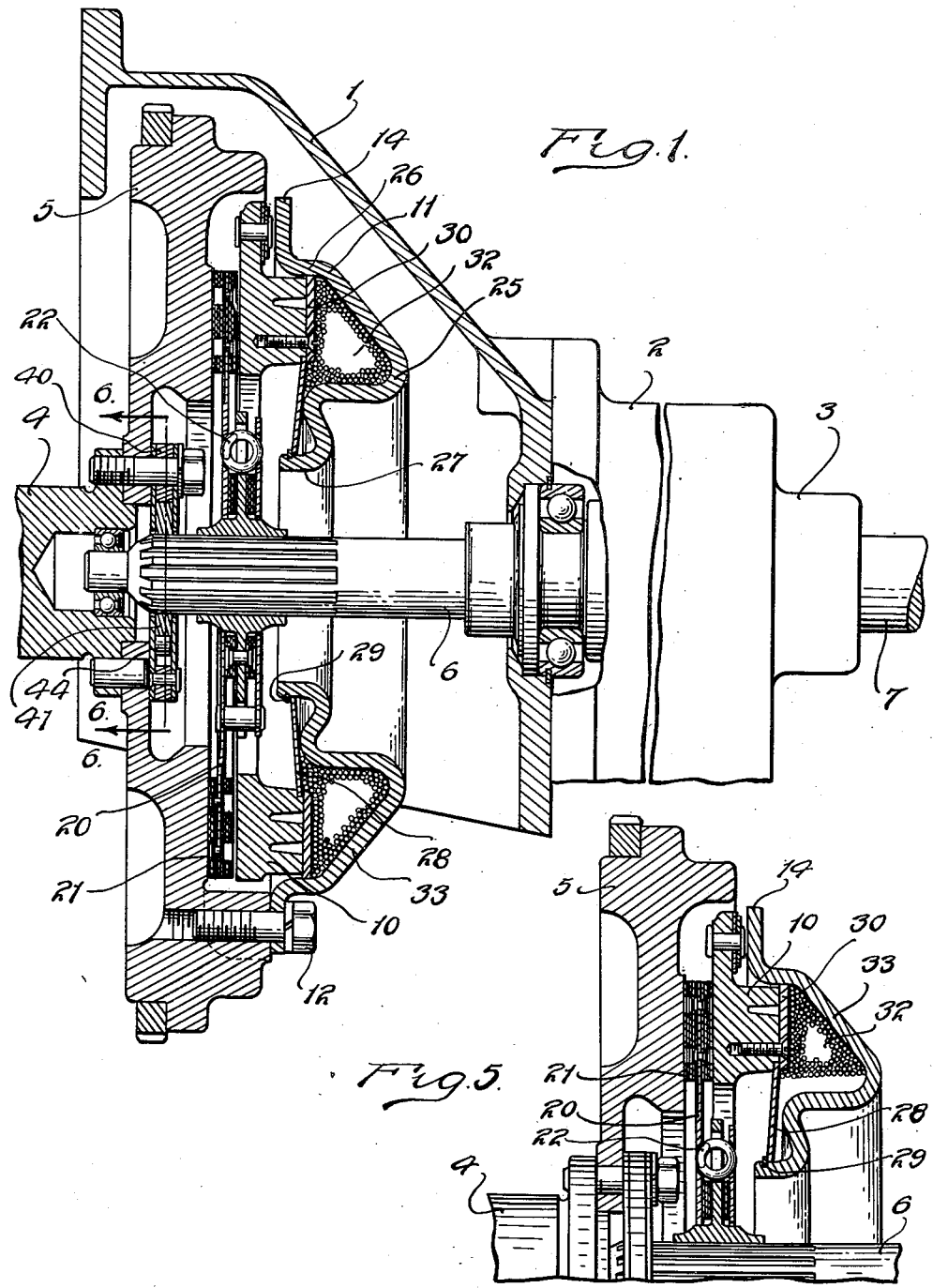

Patented July 21, 1942

2,290,513

UNITED STATES PATENT OFFICE 2,290,513

CENTRIFUGAL CLUTCH

Ernest E. Wemp, Detroit, Mich.

Application October 23, 1939, Serial No. 300,738

11 Claims. (Cl. 192—105)

This invention relates to an improved centrifugal clutch, and it has to do particularly with a clutch which is operated by centrifugal head pressure.

The material which is employed for creating the pressure by centrifugal head is comprised of divided solids, the individual particles of which are preferably of symmetrical form, and further preferably in the form of metal balls or shot. This may be considered a granular material. A substance of this kind, when subjected to centrifugal force substantially follows the law of a liquid centrifugal head device and yet no fluid sealing problems are present to prevent the substance leaking out of its retaining chamber.

In accordance with the invention, a clutch is provided which has driving and driven members, one of which members is shiftable for clutch engagement and release, and a cover plate which is so formed that it cooperates with other members to form a chamber for the substance. The chamber may be partially formed by the movable clutch member so that upon rotation the centrifugal head pressure acts to axially extend the chamber, and this movement causes clutch engagement. The centrifugal forces are usually in a radial direction and the arrangement provides for changing the forces to an axial direction to increase the efficiency.

The mass of material for creating the centrifugal head pressure may be termed a mechanical fluid or a macro-molecular fluid, as the constituent elements are visible to the naked eye. The elements of the substance are preferably of a metallic nature, solid at ordinary temperatures, incompressible, of high specific gravity and substantially spherical in form. Due to the high unit pressures developed in the clutch the elements should have a high surface hardness and be highly resistant to compression or breakage. Metal balls or shot are probably the best examples of material answering these requirements, and steel balls or shot in particular has the advantage that it can be produced commercially at a low cost per unit weight.

A structure for carrying out the invention is disclosed in the accompanying drawings.

Fig. 1 is a view largely in cross section showing a structure constructed in accordance with the invention.

Fig. 2 is a rear elevational view of the clutch.

Fig. 3 is a cross sectional view taken substantially on line 3—3 of Fig. 2.

Fig. 4 is a cross sectional view similar to Fig. 3 illustrating a different position of the parts.

Fig. 5 is a partial cross sectional view similar to Fig. 1 illustrating the clutch in engaged position.

Fig. 6 is a cross sectional view taken substantially on line 6—6 of Fig. 1.

In Fig. 1 a clutch bell housing is illustrated at 1 which is arranged to be attached to an internal combustion engine, as for example, in an automotive vehicle, while a case for a gear change transmission or the like is illustrated at 2 and which may have a housing 3 for a free-wheeling unit. The clutch structure is one which may be used with such free-wheeling unit.

The crank-shaft of the engine is shown at 4 upon which a flywheel 5 is mounted which constitutes a clutch driving member, while a driven shaft is shown at 6 extending into the transmission, the driven shaft being connected through the transmission and free-wheeling unit with the power transmitting shaft 7.

A pressure plate 10 is mounted to rotate with the flywheel and to shift axially relative thereto. A cover plate which may be a stamping preferably of relatively heavy sheet metal is generally illustrated at 11, and it is secured to the flywheel by cap screws 12. The cover plate has spaced depressions for receiving the cap screws as shown at 13 (Fig. 2), and the edge portions of the cover plate between the cap screws, as illustrated at 14, may be spaced from the flywheel as shown in Fig. 1 for ventilation purposes. The pressure plate is provided with lugs 15 to which flexible sheet metal drive plates 16 are secured (Fig. 3), and these plates are in turn riveted or otherwise secured to the cover plate as indicated at 17. Thus the pressure plate is carried by the flywheel through the means of the cover plate and is axially shiftable by the flexing of the members 16, as will be appreciated by a comparison of Figs. 3 and 4. Fig. 4 shows an engaged position of the clutch with the pressure plate forward or to the left as Fig. 1 is viewed, while Fig. 3 shows the pressure plate retracted toward the cover plate for clutch disengagement.

A driven disc 20 is mounted on the driven shaft 6 and it has facings 21 arranged to be engaged between the flywheel and the pressure plate. This driven disc may incorporate a vibration dampening structure generally illustrated at 22, but this need not be considered in detail.

It will be noted that the pressure plate has a piston-like arrangement relative to the cover plate. The cover plate is formed with a depression 25, a wall portion of which, as indicated at 26, is preferably substantially cylindrical, and the pressure plate fits within this formation. The cover plate may be fashioned as indicated with an inner peripheral portion 27, and mounted thereon is a spring element 28 advantageously in the form of a Belleville washer. This Belleville washer is held fixed by a retaining ring 29, while its outer edge fits in a recess in the pressure plate formed in part by a hardened plate 30 attached to the pressure plate by screws with hardened heads. The pressure plate, together with the spring washer, thus cooperates with the depression of the cover plate to form a circumferential chamber, and in this chamber is disposed the mechanical fluid 32 which is comprised of a multiplicity of solid elements or pieces preferably of a symmetrical nature and specifically shown as balls or shot.

The circumferential chamber is substantially completely filled with the substance. The spring 28 normally tends to shift the pressure plate to the right, as Fig. 1 is viewed, into clutch released position, and at the same time so collapsing the chamber as to place the substance under some load. This arrangement is preferably so designed that the clutch will remain disengaged at low R. P. M. but so that it will engage substantially at a predetermined higher R. P. M. Thus, an engine in an automotive vehicle may operate at an idling speed with the clutch disengaged, but upon acceleration the clutch automatically engages. Upon such higher R. P. M. the mechanical fluid is subjected to centrifugal force and shifts radially outwardly as illustrated in Fig. 5. The material substantially follows the law of a liquid centrifugal head device and acts substantially as a liquid, thus applying forces for shifting the pressure plate to the left for clutch engagement. However, to increase the efficiency of the device, one of the walls of the chamber, as for example the wall 33 which is provided by the cover plate structure, is angularly disposed toward the other wall, which in this case is the pressure plate. The forces on this angular wall are reflected substantially axially toward the pressure plate. If the angle of the wall 33 is at 45°, then the radial forces are theoretically changed to a true axial direction and the forces act through the mass of material and urge the pressure plate to the left for clutch engagement. It has been found that where the walls of such a chamber are perpendicular to the axis, the efficiency of the device with steel balls of from .060 to .065 inches in diameter was only about 15% to 20% of the theoretical pressure which would be obtained with a frictionless fluid of the same unit weight or specific gravity. However, with a direction changing wall of about 45°, the efficiency is increased to about 90 to 92% of the theoretical pressure of a frictionless fluid of the same unit weight. This arrangement actually follows the law of a centrifugal head mechanism. It might be pointed out that actual axial loads at various R. P. M's. have been obtained with the inclined wall which were from 130 to 155% greater than the theoretical calculated loads of a straight centrifugal force device without mechanical advantage and with centrifugal weights equal to the weight of the mass of the mechanical fluid.

The centrifugal head thus shifts the pressure plate to the left as Fig. 1 is viewed, upon an increase of the R. P. M. for engagement of the clutch. This flexes the spring 28. Upon deceleration to about a predetermined R. P. M., the spring returns the pressure plate to clutch disengaged position, thus partially collapsing the chamber and causing the substance to flow back into the radial inward portion of the chamber. The inclined surface 33 aids in this back flow of the substance. The plate 30 and the surface of wall 33 are preferably hardened to resist wear.

With this arrangement the pressure plate and cover plate, with the associated spring and other parts, may be prepared as a subassembly and balanced as such. Since the mass of balls or shot are normally under load, and thus held within the chamber substantially filling the same, the structure may be balanced, and this balanced relation does not substantially change when the substance flows to the clutch engaged position. This mechanical fluid may be used with such an arrangement where the movement or rate of flow of the substance is low, and it is not intended to use such a mechanical fluid where there is much movement or flow or a high rate of flow.

Since a clutch of this nature is disengaged when at rest, it may be used with an arrangement whereby the driven shaft may rotate the flywheel and engine if it be desirable or necessary, in an automotive vehicle, to push or tow the vehicle to start the engine. To this end there is an independent coupling between the flywheel and the driven shaft which takes the form of an outer element 40 secured to the flywheel and an inner element 41 secured to the driven shaft. The outer element is provided with a number of notches 42, while the inner element is provided with notch formations 43, and rollers 44 are disposed between these two elements. The direction of rotation of this structure, as shown in Fig. 6, is counter-clockwise, and the roller marked A is shown as being in a driving position. The notches are so arranged that one of such rollers may approximate a driving position, regardless of the position in which the motor and driving member stop. If the torque is delivered in a normal direction from the driving member to the driven member, starting from the position shown in Fig. 6, the roller A is moved up the inclined surface on the inner element 41 and thus disposed in its pocket, as are the other rollers, and the rollers stay in the pockets by centrifugal force, and thus the device is completely ineffective, so long as the engine is operating. But with the engine at rest, if the inner member 41 is caused to move counter-clockwise by towing the vehicle, one of the balls, such as the ball A, will drop into a driving position to rotate the outer member 40. As soon, however, as the engine begins to operate, the driving roller is moved outwardly into its pocket. This is merely one form of arrangement which may or may not be used with a centrifugal clutch of this general type.

With a clutch of this nature, high torque capacities may be obtained, which is a result of the high unit pressure. With steel shot of from .060 to .065 inch in diameter, the weight per cubic foot is about 291.5 lbs. or about 4.6 times that of water. The pressure varies directly with the unit weight of the substance, and accordingly, it will be seen that high pressures and resultant high torque capacity can be easily obtained. And this can be done with a small unit on a small radius. The pressure also varies with the lineal velocity which in turn is governed by the radius. The pressure on the piston equals the unit pressure times the area. The unit pressure varies with the square of the lineal velocity and the area varies with the square of the radius. Thus a slight increase in the radius will result in a great increase in the total pressure and capacity of the clutch.

In some of the accompanying claims the terms "ball" or "balls" are used in making reference to the mass of material or medium which produces the centrifugal head. This term is to be considered broadly because it is used for convenience and brevity. The use of the terms is not intended to limit the particles to a spherical shape as some of the balls may be composed of a multiplicity of flat sides or may be somewhat elongated as a foot ball, the thought being that all balls are not necessarily spherical. It is also stated that the elements are symmetrical, and this is used in the sense that the particles are of such design that the mass has a certain fluidity without much tendency to pack together and maintain a geometrical shape. The balls or shot may be used in a dry condition or may be used in a moistened or lubricated condition which may lessen the interfacial friction.

I claim:

1. A clutch comprising, a driving member, an axially movable pressure plate, a driven member arranged to be packed therebetween, a cover plate fashioned to provide a recess, a spring member of solid formation acting upon the pressure plate and cover plate and serving with the pressure plate to close the recess and form a chamber, a mass of material substantially filling the chamber and comprising balls for exerting centrifugal head upon rotation for shifting the pressure plate relative to the cover plate for clutch engagement, said spring loading the pressure plate for clutch disengagement and serving to place the mass of material under load.

2. A centrifugal clutch comprising, a driving member, a pressure plate, a driven member arranged to be packed therebetween, a cover plate formed to provide an annular recess, the pressure plate including a portion disposed piston-like in the recess, a spring washer interconnecting the pressure plate and cover plate and closing the recess to form a chamber, a mass of material substantially filling the chamber and comprising balls, said spring washer normally holding the pressure plate retracted toward the cover plate for clutch disengagement and for placing the mass of material under load, said mass of material exerting centrifugal head upon rotation to shift the pressure plate axially for clutch engagement.

3. A centrifugal clutch comprising, a driving member, a pressure plate, a driven member arranged to be packed therebetween, a cover plate fashioned to provide an annular recess opening toward the pressure plate, said pressure plate having an annular portion for closing the outer portion of the recess, a washer-like spring functioning between the pressure plate and the inner portion of the cover plate for closing the inner part of the recess to form a chamber, a mass of material in the chamber comprising balls normally held under load by the spring washer with the pressure plate retracted into the recess for clutch disengagement, said material exerting centrifugal head upon rotation for shifting the pressure plate for clutch engagement.

4. A centrifugal clutch comprising, a driving member, a pressure plate, a driven member arranged to be packed therebetween, a cover plate fashioned to provide an annular recess opening toward the pressure plate, said pressure plate having an annular portion for closing the outer portion of the recess, a washer-like spring functioning between the pressure plate and the inner portion of the cover plate for closing the inner part of the recess to form a chamber, a mass of material in the chamber comprising balls normally held under load by the spring washer with the pressure plate retracted into the recess for clutch disengagement, said material exerting centrifugal head upon rotation for shifting the pressure plate for clutch engagement, the outer wall of the recess in the cover plate being disposed angularly toward the pressure plate to change the direction of forces of said material substantially to an axial direction.

5. A centrifugal clutch comprising, a driving member, a pressure plate, a driven member arranged to be packed therebetween, a cover plate having an annular recess, a washer-like spring associating the pressure plate and cover plate, the pressure plate and cover plate being arranged to close the recesses to form a chamber, a portion of the cover plate which forms an outer wall of the recess being disposed to extend angularly toward the pressure plate, and a mass of material within the chamber for exerting centrifugal head upon the pressure plate upon rotation to shift the same for clutch engagement with the forces being changed substantially to an axial direction by said angular wall.

6. A subassembly for a centrifugal clutch comprising, a cover plate, a pressure plate, means connecting the pressure plate and cover plate for rotation in unison and for relative axial shift, said cover plate having an annular recess, the pressure plate having an annular portion disposed in the outer part of the recess, a spring of washer formation between the annular portion of the pressure plate and inner part of the cover plate for closing the recess to form a chamber, said spring normally retracting the pressure plate toward the cover plate, and a mass of material within the chamber comprising balls for exerting centrifugal head upon rotation.

7. A subassembly for a centrifugal clutch comprising, a cover plate, a pressure plate, means connecting the pressure plate and cover plate for rotation in unison and for relative axial shift, said cover plate having an annular recess, the pressure plate having an annular portion disposed in the outer part of the recess, a spring of washer formation between the annular portion of the pressure plate and inner part of the cover plate for closing the recess to form a chamber, said spring normally retracting the pressure plate toward the cover plate, and a mass of material within the chamber comprising balls for exerting centrifugal head upon rotation, the outer wall of the recess in the cover plate being disposed angularly relative to a radial line and toward the pressure plate for changing the forces of the material substantially to an axial direction.

8. A subassembly for a centrifugal clutch comprising, a cover plate, a pressure plate, flexible sheet metal members connecting the pressure plate and cover plate for rotation in unison and for relative axial shift, said cover plate being formed to provide an annular recess, the pressure plate having an annular formation functioning in the outer portion of the recess, a spring washer between said annular portion of the pressure plate and the inner part of the cover plate for urging the pressure plate toward the cover plate and, together with the pressure plate, closing the recess to form a chamber, and a mass of material comprising balls disposed in the chamber and held under load by the spring washer.

9. A subassembly for a centrifugal clutch comprising, a cover plate, a pressure plate, flexible sheet metal members connecting the pressure plate and cover plate for rotation in unison and for relative axial shift, said cover plate being formed to provide an annular recess, the pressure plate having an annular formation functioning in the outer portion of the recess, a spring washer between said annular portion of the pressure plate and the inner part of the cover plate for urging the pressure plate toward the cover plate and, together with the pressure plate, closing the recess to form a chamber, and a mass of material comprising balls disposed in the chamber and held under load by the spring washer, the outer wall of the recess in the cover plate being inclined toward the pressure plate to change the forces of the material substantially into an axial direction.

10. A centrifugal clutch comprising, a rotary member having a circumferential recess, a pressure plate member non-rotatably and axially shiftable relative to the first mentioned member and in the form of a circumferential piston in the recess, a mass of material substantially filling the recess and comprised of a multiplicity of balls disposed within the recess for exerting centrifugal head upon rotation, at least one of the axially spaced walls of the recess being inclined toward the other for changing radial forces substantially to an axial direction whereby to force the shiftable member in a direction out of the recess upon rotation, and a driven disc engaged by the axially shiftable member upon such movement.

11. A centrifugal clutch comprising, a rotary member having a circumferential recess, a pressure plate member non-rotatably and axially shiftable relative to the first mentioned member and in the form of a circumferential piston in the recess, a mass of material substantially filling the recess and comprised of a multiplicity of balls disposed within the recess for exerting centrifugal head upon rotation, at least one of the axially spaced walls of the recess being inclined toward the other for changing radial forces substantially to an axial direction whereby to force the shiftable member in a direction out of the recess upon rotation, a driven disc engaged by the axially shiftable member upon such movement, and retractor spring means for urging the pressure plate into the recess for clutch release and placing the mass of material under initial load.

ERNEST E. WEMP.